UNITED STATES PATENT OFFICE.

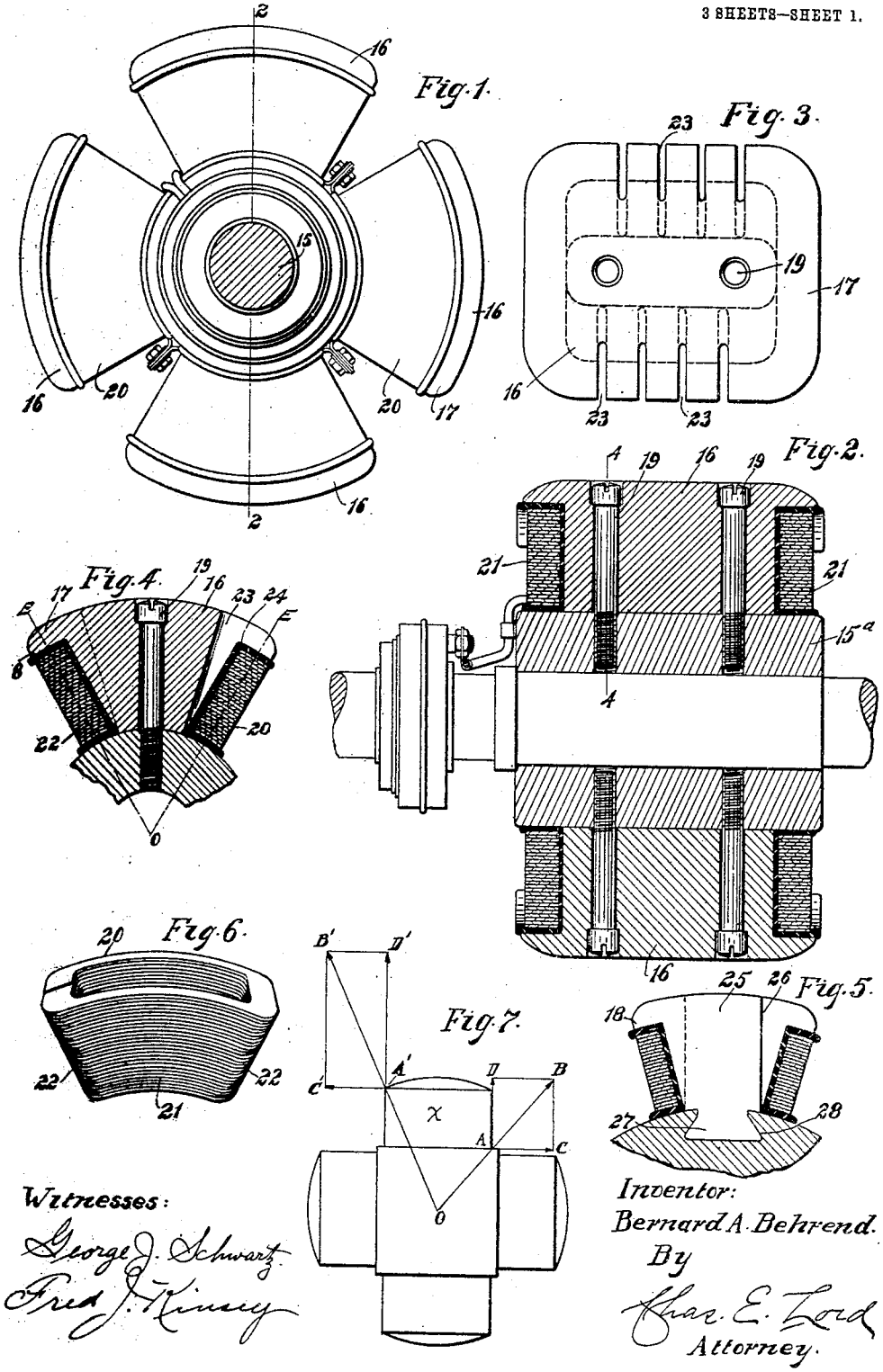

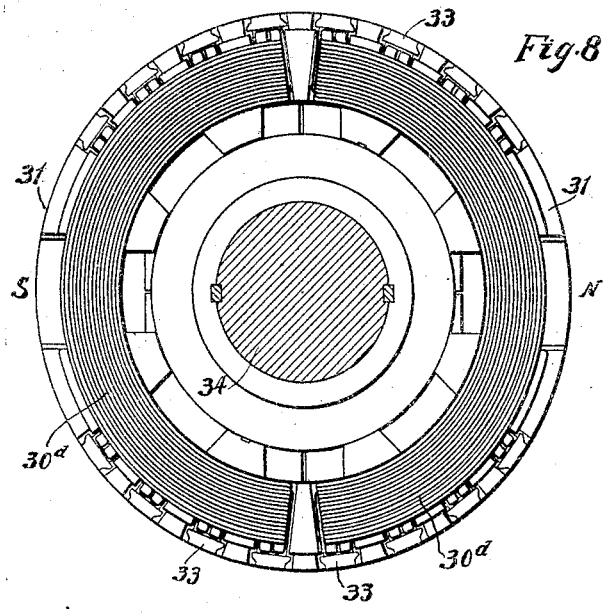
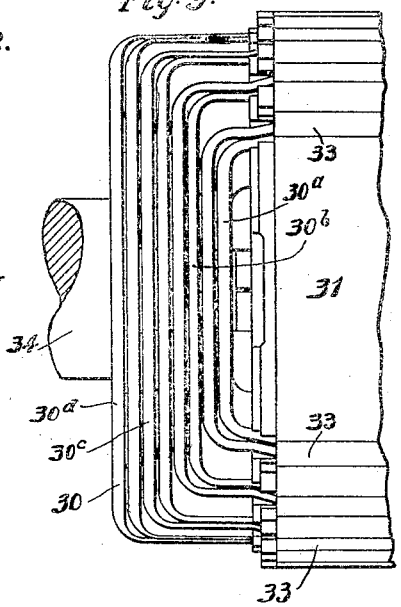
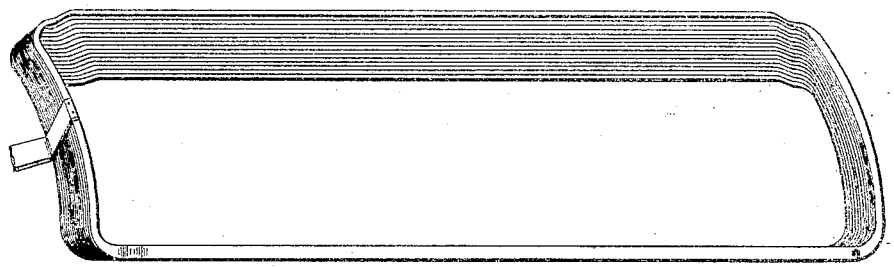
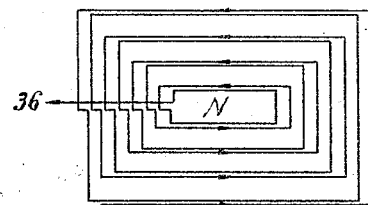

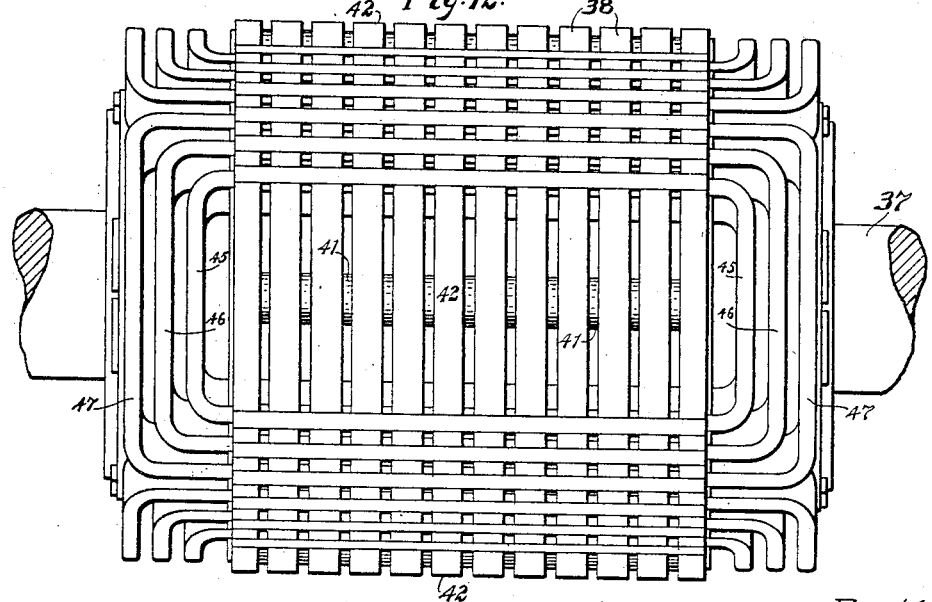

BERNARD ARTHUR BEHREND, OF NORWOOD, OHIO, ASSIGNOR, BY DIRECT AND MESNE ASSIGNMENTS, TO THE BULLOCK ELECTRIC MANUFACTURING COMPANY, A CORPORATION OF OHIO, AND ALLIS-CHALMERS COMPANY, A CORPORATION OF NEW JERSEY.

DYNAMO-ELECTRIC MACHINE.

No. 931,375.  Specification of Letters Patent.  Patented Aug. 17, 1909.

Application filed September 19, 1904. Serial No. 225,072.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My present invention relates to dynamo-electric machines and particularly to the construction and arrangement of the field coils or windings on the rotatable element of high speed rotating field alternators.

In the ordinary construction of rotating field magnets for alternating current generators, when the magnet is rotated at comparatively low speed the windings or coils on the poles thereof are not subjected to very heavy strains. However, when it is attempted to apply this construction to the rotating element of high speed machines such as turbo-alternators, the coils or windings are subjected to such enormous centrifugal forces that they are distorted and strained even to the point of bursting.

The object of my invention is to so construct the windings or coils on the rotatable member of high speed dynamo-electric machines that the centrifugal forces acting upon said windings will tend to hold each coil or winding in position on said member rather than to distort it and throw it out of position. To this end I employ a field coil comprising a flat strip of conducting material wound edgewise and having its ends parallel and its sides converging.

More specifically considered my invention consists of a rotatable field magnet having wedge-shaped poles, and previously formed wedge-shaped coils made of strips of conducting material edgewise wound and surrounding said poles with their sides radial with respect to the axis of the rotatable field magnet.

In another aspect my invention consists of a rotatable field magnet for a high speed dynamo-electric machine having two or more poles, and windings on said poles composed of a plurality of previously formed coils having their sides radial with respect to the axis of said rotatable field magnet, the coils on each pole being arranged substantially concentrically about the pole axis.

The invention further comprises improvements in the construction and arrangement of parts of the rotor, which will be hereinafter described and more specifically stated in the appended claims.

In the accompanying drawings, which illustrate the preferred embodiments of my invention, Figure 1 represents an end view of a four pole rotatable field magnet; Fig. 2 is a vertical section on the line 2—2 of Fig. 1; Fig. 3 is a top plan view of one of the poles; Fig. 4 is a vertical sectional view on the line 4—4 of Fig. 2; Fig. 5 is a view similar to Fig. 4 illustrating a modified form of pole construction; Fig. 6 is a perspective view of one of the formed coils removed from its pole; Fig. 7 is a diagram of the forces acting upon the windings in the ordinary construction of rotating field magnets; Fig. 8 is an end view of a modified form of my invention illustrating a two pole rotatable field magnet; Fig. 9 is a plan view of one end of the rotating field magnet illustrated in Fig. 8; Fig. 10 is a perspective view of one of the formed coils employed in the modified form of invention illustrated in Figs. 8 and 9; Fig. 11 is a diagrammatic representation of the connections of the coils forming the windings on the magnet shown in Figs. 8 and 9; Fig. 12 is a further modification of my invention showing field coils constructed in accordance with the principle of my invention arranged concentrically about the poles of a four pole rotatable field magnet; Fig. 13 is an end view partly in section of a modified form of my invention shown in Fig. 12; and Fig. 14 is a diagram of the electric connections between the coils in this last mentioned modification.

Referring first to Fig. 7 of the drawings which illustrate in diagram a four pole rotating field magnet of customary construction, I have here indicated the forces acting upon the windings or coils in such a construction when rotated at high speed. Let the longitudinal axis be represented by O and let A B represent the centrifugal force acting upon a portion of the winding $x$ located at A, then if this force is resolved into two components, it will be seen that one of said components A D is parallel with the pole axis and the other, A C is at right angles thereto. It will also be seen that the component A C is of considerable magnitude and nearly equal to the component A D; the latter component, however, is directed against the pole tips or pole shoes, and the winding or coil is therefore not distorted or strained due to this component. The component A C however, acting at right angles to the pole axis and being equal on opposite sides thereof, subjects the winding to a considerable strain, which tends to distort and burst the same. Considering another portion of the winding at $A^1$, a greater distance from the longitudinal axis O than is A, the centrifugal force may be represented by the line $A^1 B^1$, and its components as $A^1 D^1$ and $A^1 C^1$, although the component $A^1 D^1$ is much greater than the component $A^1 C^1$, it is apparent that the latter component is about equal to A C, and is of considerable magnitude.

By constructing the pole pieces of the rotatable field structure of a wedge shape and the coils which surround said poles of a similar shape, and by arranging each of said coils in such a manner that the center lines of its sides coincide with radii of the rotating field magnet, the centrifugal forces acting along these center lines will be taken up by the pole tips or shoes and by successive layers or coils. There will be therefore no tendency for coils constructed and arranged in this manner (to be hereinafter more specifically described) to become distorted or strained by the centrifugal forces acting thereupon.

Referring now to Figs. 1 to 4 inclusive, 15 represents the shaft upon which the poles 16 of the rotatable field magnet are mounted. The poles are wedge-shaped as clearly shown in Figs. 1 and 4 and are provided with projecting flanges or pole shoes 17, the inner surface of said flanges being preferably formed perpendicular to radii of the revolving field magnet as shown at 18. These poles are held in position on the hub $15^a$ by means of bolts 19. The coils 20 which surround the poles 16 are formed in a specially prepared former in the shape clearly illustrated in Fig. 6 and are placed in position on said poles, the latter being then bolted to the hub $15^a$. The coils 20 are so wound that their ends 21 are parallel to each other and their sides 22 converge toward the longitudinal axis of the rotatable member, thus giving the coil the appearance of a wedge. The sides of the coils are so arranged that the center lines therethrough coincide with radii of the rotatable member as indicated at O E, Fig. 4. It will thus be seen that since the sides of the coil are radial with respect to the longitudinal axis of the rotatable field magnet the centrifugal forces acting upon the sides of the coil act along the center lines of said sides and there is therefore no tendency for said forces to distort and strain the coil. The coil illustrated in these figures is formed of a strip of conducting material edgewise wound and it will be seen that when the coil is in position on the pole, the successive layers thereof are perpendicular to the radii O E. The coils preferably have their ends curved in arcs of circles concentric but with respect to the axis of the machine.

As illustrated in Figs. 3 and 4, each pole has in its sides slots or cut-away portions 23 for purposes of ventilation. A heavy spool 24 of insulating material is placed between the core and the coil.

In Fig. 5 I have illustrated a slightly modified structure in which the core of the pole is made up of laminæ 25, each lamina being cut away on one side along the line 26 and provided on its opposite side with the projecting flange 18. Each lamina is also provided with a dove-tailed projection 27, which engages the dove-tailed groove 28. These laminæ are assembled to form the core, the adjacent laminæ being placed with the flange 18 alternating on opposite sides of the pole, thereby leaving ventilating slots between alternate laminæ for the purpose of ventilation.

Referring now to Figs. 8 and 9, in which I have illustrated a bi-polar rotor construction with a perfectly smooth cylindrical exterior for the purpose of reducing the air resistance. In large machines having a considerable output it is quite difficult to obtain the necessary magnetic field flux if a construction similar to construction shown in Figs. 1 to 4 inclusive, is employed; that is to say, with such a construction it is difficult to arrange for the proper number of ampere-turns about the poles of the rotating magnet to obtain the desired magnetic field strength without unduly increasing the diameter and bulkiness of said magnet.

In Figs. 8 and 9 I have shown a plurality of coils 30, arranged substantially concentrically about each pole 31. These coils are arranged with their sides radial with respect to the axis of the rotatable member and their ends parallel. The general appearance of the coil is wedge-shaped as shown in Fig. 10. It will be seen that the coils are arranged in pairs and that the inner coils $30^a$ directly surround the core 31, that the coils $30^b$ surround coils $30^a$, and the coils $30^c$ surround the coils $30^a$ and $30^b$, and the extreme outside coils on each pole, namely $30^d$ surround the before mentioned coils. All of said coils have end-turns concentric with respect to the axis of the rotatable member; in fact, the extreme outside coil $30^d$ of each pole as shown in Fig. 8 has its end connection covering substantially a semi-circle concentric with the axis of the rotatable member. The space between the sides of the adjacent pairs of concentrically arranged coils is filled with blocks of magnetic material, preferably formed integral with poles 31. The sides of the coils of each pair are held in position on the pole by means of said blocks of magnetic material and wedges 33 of non-magnetic material. The shaft upon which the core of the rotatable member is mounted is indicated at 34. The coils surrounding the poles of the rotatable member in this modification are preferably connected in series in the manner indicated by the diagram Fig. 11. The current passes to and from the coils through the leads 35 and 36 in the direction indicated by the arrows, Fig. 11, so as to produce north and south poles indicated by N and S. Means not shown in these figures are provided for supporting the coil end connections. These supporting means have been omitted so as to show more clearly the arrangement of the coils on the rotatable member or field magnet.

Referring now to Figs. 12 and 13 in which I have illustrated a further modification of my invention, 37 indicates the shaft upon which are mounted the laminæ 38 forming the core of a four pole rotor. These laminæ are shaped as indicated in the upper part of Fig. 13, and are held in their proper position relative to each other by means of the bolts 40, upon which are strung the separating washers 41, preferably made of non-magnetic material. The core is provided with longitudinal ventilating passages 39. In this modification the poles indicated by 42 are formed wedge-shaped and upon these wedge-shaped poles are placed the previously formed wedge-shaped coils, 45, 46 and 47, said coils being arranged concentrically about the axis of each pole. The coils are held in position by the projections 43 of magnetic material and also by the wedges 44 of non-magnetic material. These coils are preferably formed of strips of conducting material edgewise wound in a former in such a manner that when placed in position on the poles the separate layers of the winding will lie in planes perpendicular to radii of the rotatable member. I prefer to place the previously formed coils on the poles by supporting them over the field magnet and placing them in position layer by layer. This method of winding I do not claim in this application, but make the subject matter of another application for patent, Serial No. 238,175, filed Dec. 23, 1904.

The end connections of the coils 45, 46, and 47 are held in position by means of an outside cylindrical cover 48, against which the coil ends are forced radially by means of the wedges 49 mounted on the collar 50, which has the inclined exterior surface 51. Means not shown are provided for holding the wedges 49 in position. The arrangement is such that the coils are spaced apart to insure proper ventilation. Spacing blocks 52 are provided for maintaining the ends of the coils 45, 46 and 47 the proper distance apart when supporting means for the end connections are forced into position. The coils forming the winding of this modified form of rotor construction are preferably connected in series in the manner indicated in the diagram Fig. 14, the current being led to and from said coils by means of the leads 35 and 36 in the direction indicated by the arrows Fig. 14, so as to produce north and south poles at N and S.

Although I have illustrated certain specific modifications of my invention, I do not care to be limited to the structures herein shown and described, and I aim in the appended claims to cover all the changes and modifications which do not involve a departure from the spirit and scope of my invention.

Having thus described my invention, what I claim as new and desire to secure by Letters Patent is:—

1. In the rotatable member of a dynamo-electric machine, a wedge-shaped field coil formed of a continuous edgewise wound strip of flat conducting material having the end portions of its turns lying in arcs of concentric circles, in combination with a wedge-shaped pole piece which said coil surrounds and means for retaining said end portions against displacement due to the action of centrifugal force.

2. In a high speed rotating field dynamo-electric machine, a rotatable member having wedge-shaped poles and a winding thereon comprising a plurality of coils each consisting of a continuous strip of edgewise-wound strap conductor, said coils having their sides converging and their ends parallel, and means for preventing displacement of said ends by centrifugal action.

3. In a dynamo-electric machine, a rotatable field magnet, having integral wedge-shaped poles, and previously-formed wedge-shaped coils each made of a continuous strip of conducting material edgewise-wound and said coils surrounding said poles with their sides radial with respect to the axis of said rotatable field magnet and their ends in arcs of circles concentric with said axis.

4. In a dynamo-electric machine, a rotatable field magnet, having integral wedge-shaped poles, and previously-formed wedge-shaped field coils of edgewise-wound strap conductor having their sides radial with respect to the axis of said rotatable field magnet and their ends in arcs of circles concentric with said axis, said pole pieces having ventilating slots therein.

5. In a high speed dynamo-electric machine, a rotatable field magnet having two or more integral wedge-shaped poles, and windings on each of said poles composed of a plurality of concentric coils, each being formed of a continuous flat strip edgewise-wound, and having sides radial with respect to the axis of said rotatable field magnet and parallel ends.

6. In a high speed dynamo-electric machine, a rotatable field magnet, having two or more integral wedge-shaped poles, a plurality of concentrically arranged coils for each pole, each of said coils being wound edgewise from a continuous strip of conducting material and said coils being mounted on the poles with their sides radial with respect to the axis of said rotatable field magnet and the individual turns of said coils perpendicular to radii of said rotatable field magnet, said coils also having their ends projecting axially of the field magnet beyond the poles, and means for clamping and retaining in position against displacement said projecting ends.

7. In a high speed dynamo-electric machine, a rotatable field magnet, having two or more integral wedge-shaped poles, windings on each pole composed of a plurality of coils each formed of a continuous flat strip edgewise wound, said coils having their sides radial with respect to the axis of said rotatable field magnet, and the individual turns of the coils being in concentric cylindrical surfaces the coils on each pole being arranged substantially concentrically about the pole axis and having their ends projecting axially of the field magnet beyond the pole, and means for retaining said projecting ends against displacement under the action of centrifugal force.

8. In a high speed dynamo-electric machine, a rotatable field magnet, having two or more integral wedge-shaped poles, windings on each pole composed of a plurality of concentrically arranged coils each coil being wound edgewise from a continuous strip of conducting material, said coils being mounted on said poles with their ends projecting therefrom and with their sides radial with respect to the axis of said rotatable field magnet, and the individual turns of said coils perpendicular to radii of said field magnet, and means for holding said coils in position on said field magnet and for retaining said projecting ends against displacement under the action of centrifugal force.

9. In a high speed dynamo-electric machine a rotatable field magnet having two or more integral poles, windings on each pole composed of a plurality of previously formed coils of edgewise-wound strap conductors, said coils having their sides radial with respect to the axis of said field magnet, the coils on each pole also being arranged substantially concentrically about the pole axis and having their end connections lying in arcs of circles concentric with the axis of said field magnet.

10. In a high speed dynamo-electric machine, a rotatable field magnet, having two or more poles, windings on said poles composed of a plurality of previously-formed coils having their sides radial with respect to the axis of said field magnet, the coils on each pole being arranged substantially concentrically about the pole axis, means for holding the sides of said coils in position on said poles and independently adjustable means for holding the ends of said coils in position.

11. In a high speed dynamo-electric machine, a rotatable field magnet, having two or more integral poles, windings on said poles composed of a plurality of previously-formed coils, each coil being made from a single strip of flat conducting material wound edgewise and having its sides radial with respect to the axis of said field magnet and the separate turns perpendicular to radii of the field magnet, the coils on each pole being arranged substantially concentrically about the axis of the pole and having their end connections lying in arcs of circles concentric with the axis of the field magnet.

12. In a high speed dynamo-electric machine, a rotatable field magnet, having two or more integral poles, windings on said poles composed of a plurality of previously-formed coils of edgewise-wound strap conducting material, said coils having their sides radial with respect to the axis of said field magnet, the coils on each pole being arranged substantially concentrically about the pole axis, and means for maintaining the coils on each pole a predetermined distance apart so as to provide ventilating spaces between the coils.

13. In a high speed dynamo-electric machine, a rotatable field member comprising a core having integral poles with sides diverging outwardly, a plurality of concentric field coils on each pole, each of said coils being formed of a continuous strip of edgewise-wound flat conducting material, and having sides radial with respect to the axis of the machine and projecting ends, and adjustable means for supporting said projecting ends.

14. In a high speed dynamo-electric machine, a rotatable field member comprising a core having radial slots and integral poles, and a plurality of coils in said slots, the coils being arranged in groups concentrically about each pole, each of said coils being formed of a continuous strip of edgewise-wound flat conducting material, and having sides radial with respect to the axis of the machine, and ends in parallel planes at substantially right angles to said axis.

15. In a rotary field member of a dynamo-electric machine, a cylindrical core having wedge-shaped pole pieces, projecting teeth between said pole pieces, a coil surrounding each wedge-shaped pole piece, a second coil concentric with the first coil and surrounding each pole piece and the projecting teeth adjacent thereto, said coils being formed of strips of edgewise-wound conducting material and having their ends parallel and their sides radial, and means for retaining said ends in position against displacement by centrifugal force.

16. In a rotary field member of a dynamo-electric machine, a cylindrical core having wedge-shaped pole pieces, projecting teeth between said pole pieces, a coil surrounding each wedge-shaped pole piece, a second coil concentric with the first coil and surrounding each pole piece and the projecting teeth adjacent thereto, said coils being formed of strips of edgewise-wound conducting material having their sides radial and their ends projecting from the ends of said core, the end portions of the individual layers of the coils being in concentric cylindrical surfaces and means for supporting said projecting ends and retaining them in position against radial displacement during the operation of the machine.

17. In a rotary field member, a cylindrical core provided with groups of radial slots and pole pieces between adjacent groups, wedge-shaped field coils of edgewise-wound strap conducting material located in said slots, there being a number of concentric coils per pole, said coil having radial sides and ends which project beyond the ends of the core, the end portions of the individual layers of the coils being in concentric cylindrical surfaces and means for supporting and retaining in position against displacement due to centrifugal action the projecting portions of said coils.

In testimony whereof I affix my signature, in the presence of two witnesses.

BERNARD ARTHUR BEHREND.

Witnesses:
   LILLIAN J. BRITTON,
   FRED J. KINSEY.